(12) United States Patent
Presler-Marshall (10) Patent No.: US 11,556,608 B2
(45) Date of Patent: Jan. 17, 2023

(54) CACHING FOR SINGLE PAGE WEB APPLICATIONS

(71) Applicant: salesforce.com, inc., San Francisco, CA (US)

(72) Inventor: Martin Presler-Marshall, Chapel Hill, NC (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/208,117

(22) Filed: Mar. 22, 2021

(65) Prior Publication Data

US 2022/0300574 A1 Sep. 22, 2022

(51) Int. Cl.
*G06F 16/00* (2019.01)
*G06F 16/957* (2019.01)
*G06F 12/0802* (2016.01)

(52) U.S. Cl.
CPC ...... *G06F 16/9574* (2019.01); *G06F 12/0802* (2013.01); *G06F 2212/60* (2013.01); *G06F 2212/72* (2013.01)

(58) Field of Classification Search
CPC .......................... G06F 16/9574; G06F 12/0802
USPC ........................................................ 711/118
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Jae U Yu
(74) *Attorney, Agent, or Firm* — Kwan & Olynick LLP (57) ABSTRACT

Systems and methods are described for processing of requests of a single page application in an application server. The method includes receiving a request from a component of a single page application from a user device, getting a page identifier (ID) from the request, getting a user ID from the request, and searching a cache lookup table for a cache entry associated with the page ID. When no cache entry for the page ID is found in the cache lookup table, a new cache entry is created in the cache lookup table for processing of the request, and the request is processed using the new cache entry to generate a response. When a cache entry for the page ID is found in the cache lookup table, the user ID from the request is compared to a user ID in the cache entry, and when the user IDs match, the request is processed using the found cache entry to generate the response; and the response is sent to the single page application on the user device.

20 Claims, 5 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182357 A1* | 9/2003 | Chess ............ G06F 16/9574 709/230 |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0055775 A1* | 3/2007 | Chia ................ H04L 67/04 709/225 |
| 2009/0177744 A1 | 7/2009 | Marlow et al. |
| 2010/0325357 A1* | 12/2010 | Reddy ............ H04L 67/2842 709/227 |

* cited by examiner

CACHING FOR SINGLE PAGE WEB APPLICATIONS

TECHNICAL FIELD

One or more implementations relate to processing of web content by application servers in cloud computing environments, and more specifically, to caching for single page web applications in a cloud computing system.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

A single-page application (SPA) is a web application or website that interacts with the user by dynamically rewriting the current web page with new data from a web application server, instead of the default method of the browser loading entire new pages. The goal is faster transitions that make the website feel more like a native application. A SPA typically makes multiple requests to the application server to retrieve data and metadata needed to display the page. This means that SPAs often have higher server-side cost than do traditional web applications.

One technique to address this issue is to make extensive user of caching of data (including static content, metadata, and dynamic data) on the client system. Caching is typically used for content which does not change frequently (e.g., static content such as logos, borders, headers, etc.) or for content where it is acceptable for the user to see stale information. For cases where the caching of stale content is unacceptable, one approach is to improve caching of the content at or near the web application server and add an invalidation solution to make sure the content served to the client system is not stale. However, this invalidation solution usually results in code that is complex, expensive to develop, and error-prone.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Embodiments of the present invention comprise a method and system for caching one or more components of a single page on an application server for a duration of a user interaction with the single page. When a user accesses (e.g., logs in to) a web-based single page application (SPA), the user is shown a hypertext markup language (HTML) web page (the "single page" from the term "single page application"). For all subsequent interactions with the single page, all user interactions are usually handled by executing code (such as JavaScript code) in the browser on the client computing system, which determines what data is needed to build the single page display, sends requests to the application server for the data, generates the HTML needed to display the data, and updates the content in the browser with that new HTML. Thus, a SPA sends multiple hypertext transport protocol (HTTP) requests for what the user considers a single page. Embodiments of the present invention provide for improved caching across those requests.

Figure 1:
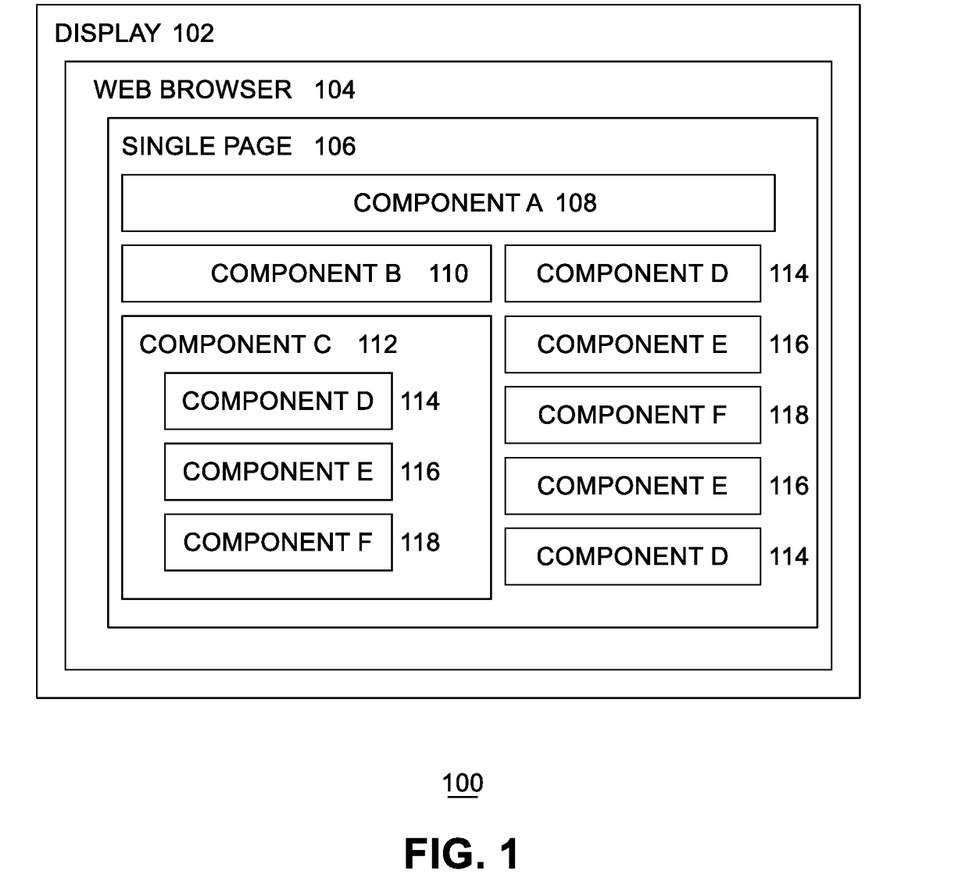
FIG. 1 illustrates an example display of a single page according to some embodiments.

FIG. 1 illustrates an example 100 display of a single page according to some embodiments. Display 102 of a user's computing device (not shown) shows the output of a web browser 104 as is well known. Web browser 104 displays a single page 106 of a web site or web application. A single page includes multiple components of the web page. Each component represents an independent client-side component that displays data. These client-side frameworks for building SPAs allow web developers to create independent components to make the SPA code more manageable. In this example, single page 106 includes component A 108, component B 110, component C 112, component D 114, component E 116, and component F 118. As shown in the example, some components may be included more than once in the single page (e.g., component D 114, component E 116, and component F 118), and some components may be included within other components (e.g., component D 114, component E 116, and component F 118 within component C 112). The components need data to complete the display of information requested by a user of web browser 104, which is obtained by web browser 104 making requests to an application server. At least some of the data may be the same in more than one component. For example, data items such as a customer name, an account number, a product identifier, an address, etc., may be shown in more than one component in the single page 106 at the same time.

In a computing environment where SPAs are not used, application servers receive a first request to generate a dynamic page, and additional requests for each time the user interacts with the page. But in a SPA, many requests to the application server are needed to display a page that from the user's point of view is a single logical entity. Each request is asking for less data than in a non-SPA, but at the server side, there are redundancies (such as requesting the same data multiple times). The requests are independent, so this causes redundant processing at the server, causing higher server-side resource demands and more delays for the client.

Thus, SPAs can create problems for application server performance. Because of the component models used on clients, SPAs make multiple requests to the application server for data which must be processed at the time of the request. These requests may include retrieving data from internal or external databases or other computing systems. This increases the cost of providing SPAs to users and limits their scalability.

In some existing approaches, write-through caching is used. In write-through caching, every time the system of record (e.g., the SPA data in this example) is updated, the cache is updated at the same time. Write-through caching can be problematic for computing systems supporting transactional updates and rollbacks, and for distributed systems. Cache invalidation is another approach. Instead of updating the cache at the time of the update, the computing system waits for the update transaction to complete and directs the cache to delete any affected entries. This is simpler than write-through caching but requires that application of invalidations to the cache are performed in a timely fashion.

In SPAs, multiple requests are processed for the single page but the user may not need 100% consistency between the cache and a system of record for every request on that page. What the user probably does expect is 100% cache consistency among the requests while on that page. Thus, embodiments create a cache entry on the application server with a lifetime of the user's interaction with the single page 106. This results in several advantages. The web browser 104 obtains performance benefits from caching content at the application server across the multiple requests that happen within a single page view. Redundant data or metadata requests can be served directly from the cache, instead of getting the same data multiple times from internal or external sources. No revalidation, write-through, or invalidation logic is required. By scoping cache processing to just a single page view, embodiments automatically match the user's consistency expectations, so the entire problem of cache coherency is eliminated. That is, the cache entry for the single page is valid for only the duration of the single page view. This approach does not preclude a longer-scoped cache which implements one of the above existing approaches (e.g., write-through, invalidation, etc.). The page-level cache can be used as a level-1 cache, and cache misses on that cache can go to a level-2 cache which implements (for example) a revalidation strategy.

Figure 2:
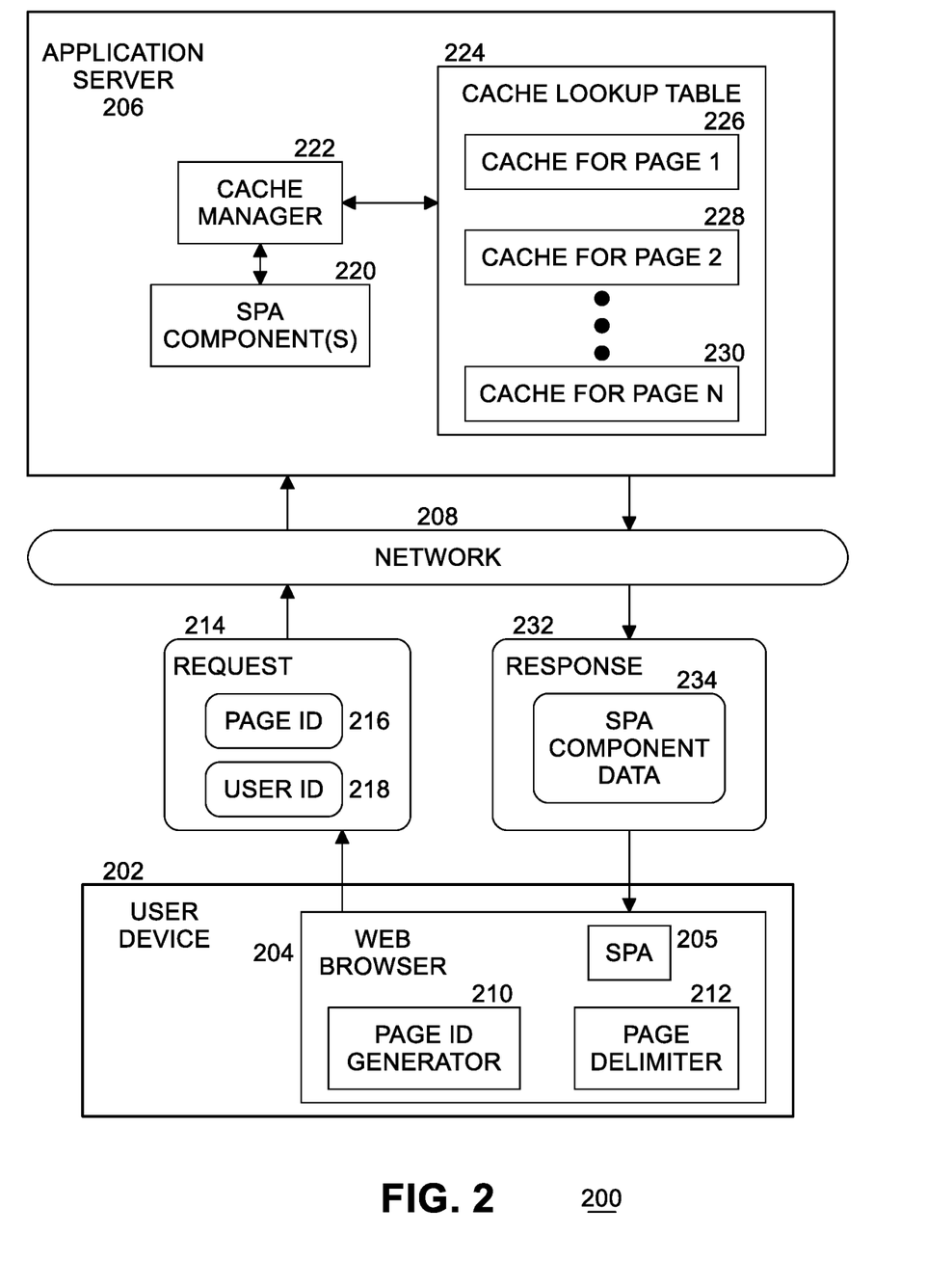
FIG. 2 is a diagram of a cloud computing environment according to some embodiments.

FIG. 2 illustrates an example cloud computing environment 200 according to some embodiments. A data center (not shown) in a cloud computing environment comprises a plurality of conventional computer servers, storage devices, network interfaces (e.g., switches, routers, etc.), and other equipment to run computer applications for users. At least one of the servers in the data center is application server 206. A user interacts with user device 202 to access applications (e.g., SPA 205) supported by application server 206 over one or more computer or communications networks 208 (e.g., an intranet, the Internet, WiFi, cellular, etc.). Examples of user devices include laptop and desktop personal computers, smart phones, tablet computers, personal digital assistants (PDAs), smart home appliances, electronic book readers, home networking equipment, and so on. In some scenarios, application server 206 is operated by a cloud service provider (CSP) and may be replicated in data centers distributed in sites throughout the world. In an embodiment, application server 206 executes code to create one or more HTML components that are sent to user device 202.

User device 202 includes web browser 204. Web browser 204 displays web content (including pages). A web page is an assembly of components that can be rendered for the web site by web browser 204. Web pages include code and/or data that define a web site's format, function and visual appearance. Web browser 204 makes multiple requests to application server 206 to display a single page in SPA 205 as discussed above. In an embodiment, web browser 204 includes page identifier (ID) generator 210 to generate a unique page ID for the single page. Any suitable process for generating unique IDs may be used. An absolute guarantee of uniqueness is not required so long as user device 202 is only processing one single page 106 at a time.

Web browser 204 includes page delimiter function 212 to detect when the single page begins and ends (e.g., during building of the single page). Detection of the end of the page by page delimiter function 212 signals page ID generator to generate a page ID for the page.

In some embodiments, 100% accuracy in detecting the beginning and ending of the single page 106 is not required. In some cases, page delimiter 212 assume that the single page view has ended when in fact there are requests still to be processed for the single page 106. An example of this occurs with components that intentionally delay when they retrieve data. If a component is able to detect that it is outside the browser's viewport (that is, far enough down on the page that the user has to scroll to see the component) that component might decide to delay rendering itself for some period of time after the page is loaded. This provides a performance optimization because the processing needed to render that component won't be competing with the processing needed to render components further up on the page, and the user sees those further-up components sooner. In such an example, the lower-down component will eventually get around to loading its data, perhaps when the user scrolls down enough to see that component. This might be long after the page delimiter (212) has assumed that the page has ended. This may have an impact on the efficiency of caching as described herein by reducing the number of requests that can share a single cache instance but will not cause issues of correctness. If web browser 204 cannot determine that a single page is being processed, or when the single page begins and ends, then page ID generator 210 generates a null page ID.

Web browser 204 creates at least one request 214 to obtain data from application server 206 to display the single page. Web browser 204 may send a plurality of requests 214 for each single page. Request 214 includes page ID 216 (as generated by page ID generator 210 for the single page). If application server 206 requires user authentication, then web browser 204 ensures that request 214 includes user ID 218 to identify the user and/or user device 202. User ID 218 is a unique ID for the user and/or user device 202. User ID 218 may be transmitted from the user device to the application server by any existing HTTP mechanism, such as Basic Access Authentication (a method for an HTTP user agent to provide a username and password when making a request), OAuth (an open standard for access delegation, commonly used as a way for Internet users to grant websites or applications access to their information on other websites but without giving them the passwords) or other methods.

Application server 206 receives request 214 from user device 202 over network 208. Application server 206 includes SPA components 220 to process request 214 and generate a response 232 (once processed by web browser this results in the displayed single page), including obtaining SPS component data 234 from any data source (e.g., internal and/or external databases, storage devices, and computing systems) needed to fulfill the request. Each request 214 is directed to a server-side SPA component. The application server's cache manager 222 uses cache lookup table 224 to find a cache entry to use for that request. Once the SPA component has the cache entry, application server 206 forwards the request to the appropriate server-side SPA component 220 to process, and that component make uses of the cache entry to reduce the number of times services (e.g., services 442 in FIG. 4B below) are called to obtain needed data.

Thus, SPA components 220 communicate with cache manager 222 to obtain data, as needed by the single page, that is cached in cache lookup table 224. Cache lookup table 224 comprises a plurality of entries, with each entry storing a cache of data for one or more components a single page for an individual view of the page by the user. For example, cache lookup table 224 includes cache for page 1 226, cache for page 2 228, . . . cache for page N 230, where N is a natural number. Cache manager 222 creates, accesses, and deletes cache entries in cache lookup table 224 as needed. In an embodiment, cache manager 222 indexes into a cache entry in cache lookup table by page ID 216. In an embodiment, cache manager 222 stores data obtained from one or more data sources (e.g., internal and/or external databases, storage devices, and computing systems) in cache lookup table 224 for use during single page processing so that redundant requests for data from those data sources are eliminated, thereby improving application server/web browser efficiency.

If application server 206 is written in a multithreaded language, it is assumed that the cache entries are thread safe, so that multiple processing threads of application server 206 processing requests 214 in parallel can safely access the cache entries. If the cache entries exist in shared memory across multiple processes, it is assumed that mechanisms are in place to allow parallel access without causing correctness problems. These mechanisms are implementation-dependent and any suitable approach may be used.

SPA component 220 220 builds response 232, including, as needed, obtaining data and/or metadata needed for the response 234 from data stored in a cache entry of cache lookup table 224 for the single page. Application server 206 sends response 232 (including SPA component data 234) back to web browser 204 on user device 202. Web browser 204 processes response 232 as part of SPA 205 for display to the user.

When application server 206 receives request 214, there are three possible outcomes for processing the request relating to cache lookup table 224. First, if the request requires data which will be used for only this request (not shared with other requests), a cache entry for this request is only used for processing of this request. After the request is processed, the cache entry is deleted. Second, if the request requires data for this request but the data can be used for other, subsequent requests, the data is saved in a cache entry for possible future use. The cache entry is tagged with the user ID 218 (if any) of the user making the request (e.g., by storing the user ID of the request in the cache entry). Third, if the request requires data that has already been used by one or more previous requests for this single page view, the cache entry created during processing of a previous request is accessed to obtain the needed data. This is the outcome that is desirable for performance reasons, since obtaining the needed data from the cache entry in cache lookup table 224 on application server 206 is more efficient than obtaining the data from the original data source (which may be in a different computing system in the cloud computing environment). By sharing the needed data across multiple requests, overall system performance is improved.

Figure 3:
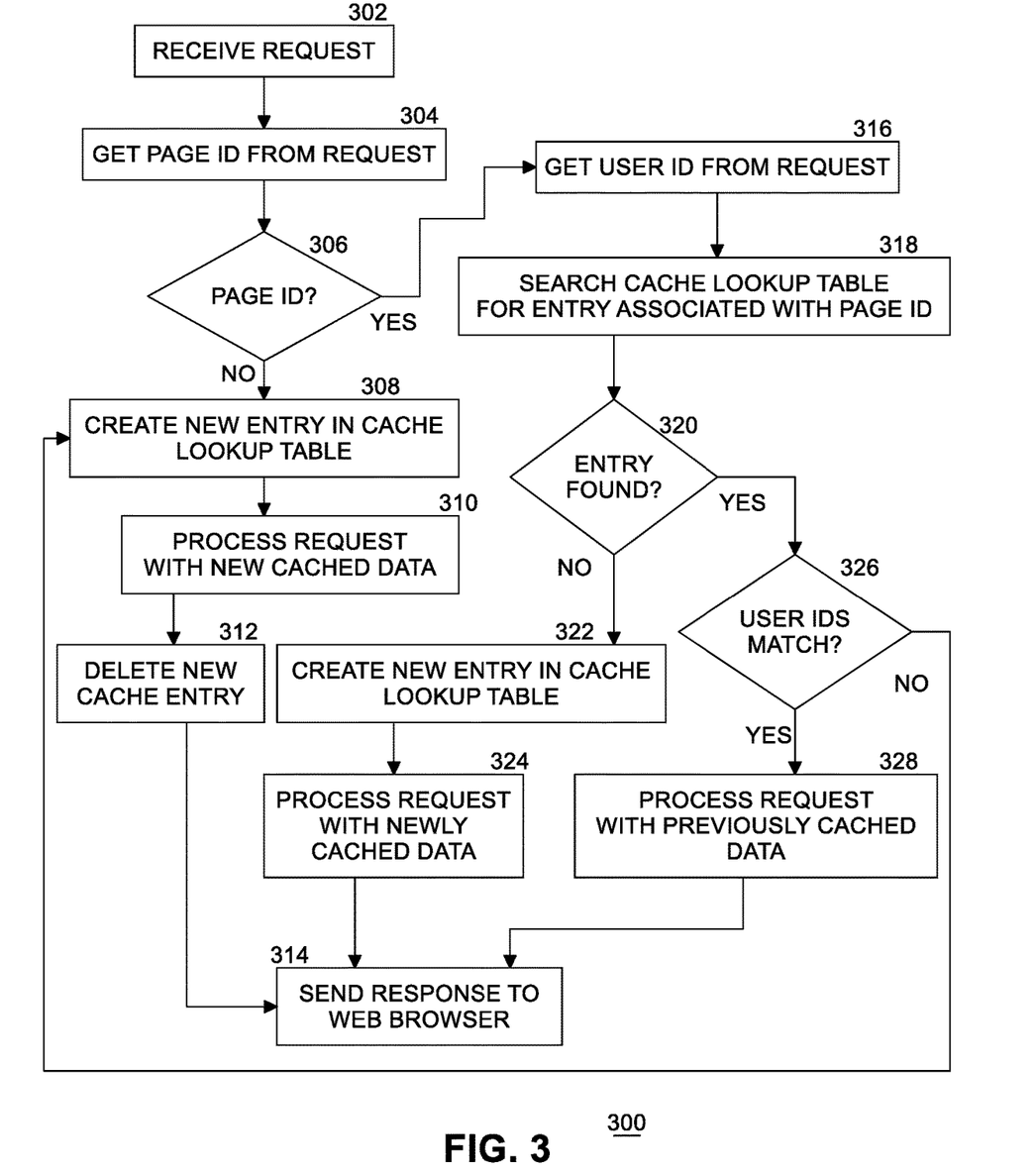
FIG. 3 is a flow diagram of single page caching processing according to some embodiments.

FIG. 3 is a flow diagram 300 of single page caching processing according to some embodiments. At block 302, a request 214 is received by application server 206 from a component of a SPA 205. In an embodiment, request 214 is an HTTP request. At block 304, application server 206 gets the page ID 216 from the request. The page ID can be sent in any manner. Some options include adding the page ID as a custom HTTP header, adding the page ID as a query-string parameter in the uniform resource locator (URL) of the single page, or encoding the page ID within the body of an HTTP Post request. Application server 206 and web browser 204 must use the same mechanism for communicating the page ID and that the application server is able to extract the page ID from the request.

If the request 214 does not include a page ID 216 (e.g., the page ID is null), then at block 308 cache manager 222 creates a new entry in cache lookup table 224 for the component data and/or metadata obtained by application server 206 to process the request. At block 310, SPA component 220 processes the request 214 to create response 232 with the component data 234 cached only for this request. At block 312, cache manager 222 deletes the new cache entry (since this cache entry is only used for processing the current request). At block 314, application server 206 sends response 232 (including SPA component data 234) to web browser 204 for processing by SPA 205 on user device 202.

If the request 214 does include a page ID 216, then at block 316, application server 206 gets user ID 218 from the request. If no user ID is retrieved from the request, an anonymous user identity is used. At block 318, application server 206 directs cache manager 222 to search cache lookup table 224 for an entry associated with the page ID. If no cache entry indexed by the page ID is found at block 320, then at block 322 cache manager 222 creates a new entry in the cache lookup table for the data and/or metadata obtained by application server 206 to process the request. At block 324, SPA component 220 processes the request 214 to create response 232 with the newly cached component data (e.g., SPA component data 234). At block 314, application server 206 sends the response 232 (including SPA component data 234) to web browser 204 for processing by SPA 205 on user device 202.

If a cache entry is found at block 320, then at block 326, application server 206 compares the user ID of the request to the user ID in the cache entry. If the user IDs do not match, then the current request is not part of the same single page view for the user identified by the user ID in the request. In that case, the cached entry cannot be used for the request and processing continues with block 308. If the user IDs match, then the current request is part of the same single page view for the user identified by the user ID in the request and at block 328, SPA component 220 processes the request 214 to create response 232 232 with the previously cached component data from the cache entry. At block 314, application server 206 sends the response 232 232 (including SPA component data 234) to web browser 204 for processing by SPA 205 on user device 202.

Example Electronic Devices and Environments. One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, tablet computers, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
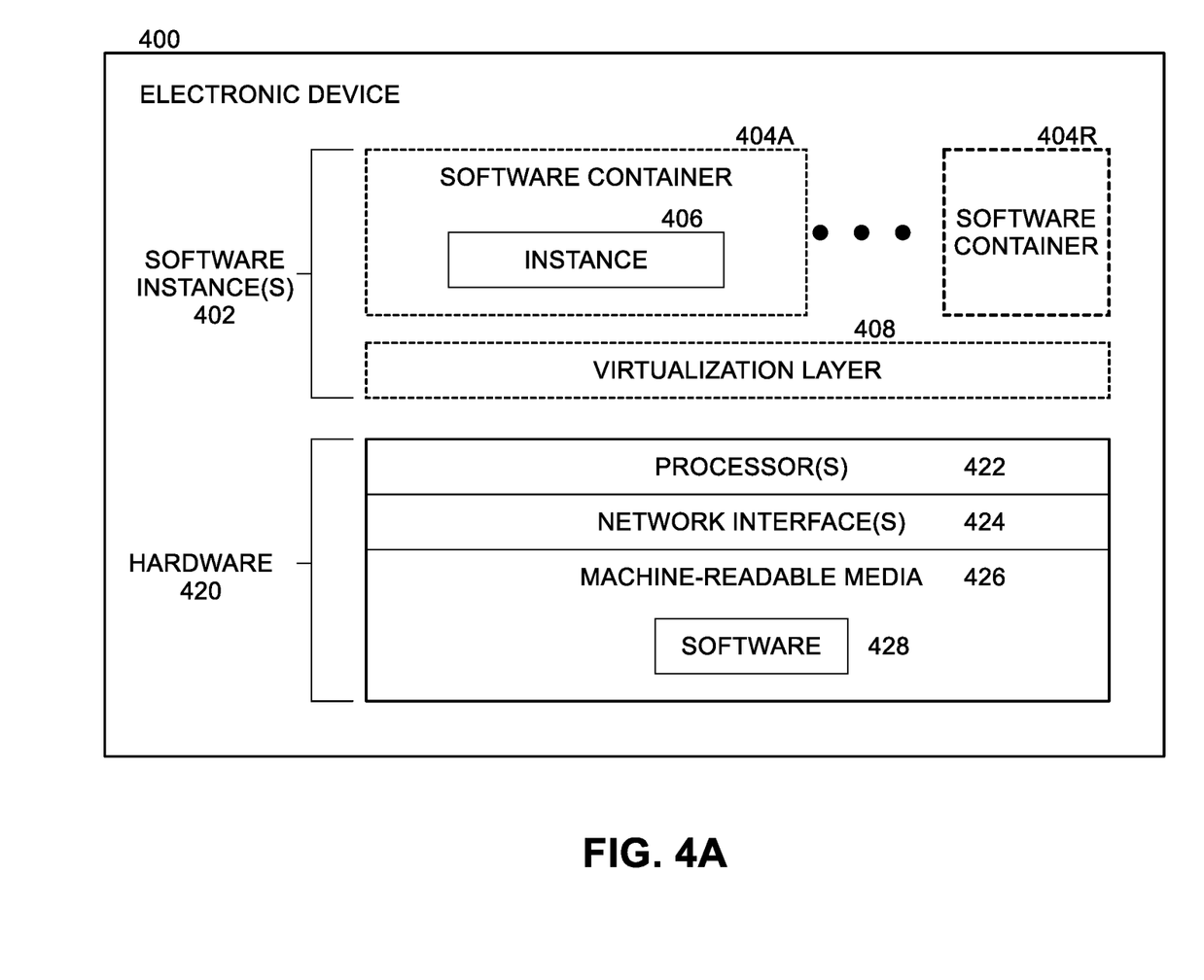
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients/user devices and application server 206 may be implemented in one or more electronic devices 400. In one implementation: 1) each of the clients/user devices is implemented in a separate one of the electronic devices 400 (e.g., in end user devices where the software 428 represents the software to implement clients to interface directly and/or indirectly with the application server 206 (e.g., software 428 represents a web browser, a native client, a portal, a command-line interface, and/or an application programming interface (API) based upon protocols such as Simple Object Access Protocol (SOAP), Representational State Transfer (REST), etc.)); 2)

the application server 206 is implemented in a separate set of one or more of the electronic devices 400 (e.g., a set of one or more server devices where the software 428 represents the software to implement the application server 206); and 3) in operation, the electronic devices implementing the clients/user devices and the application server 206 would be communicatively coupled (e.g., by a network) and would establish between them (or through one or more other layers and/or or other services) connections for sending requests and receiving single pages.

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 4B:
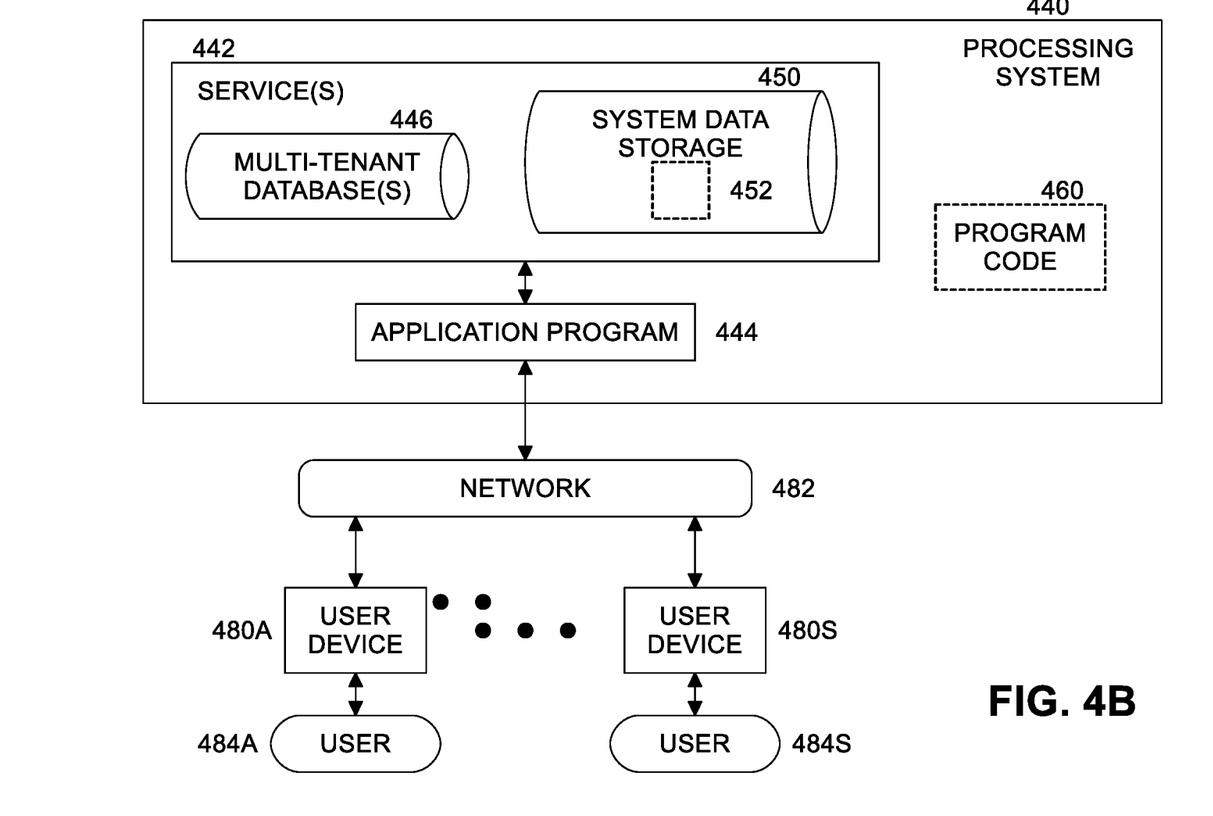
FIG. 4B is a block diagram of a deployment environment according to some example implementations.

Example Environment. FIG. 4B is a block diagram of a deployment environment according to some example implementations. A system 440 includes hardware (e.g., a set of one or more server devices) and software to provide service(s) 442, including application server 206. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400. In some embodiments, service(s) 442 includes services provided by application server 206.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the schema inference and log data validation system 200, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

Conclusion. In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
    processing, by one or more servers, a request received from a component of a single page application on a client device;
    obtaining, by the one or more servers, a page identifier (ID) from the request;
    obtaining, by the one or more servers, a user ID from the request;
    searching, by the one or more servers, a cache lookup table for a cache entry associated with the page ID;
    determining, by the one or more servers, whether a cache entry for the page ID is found in the cache lookup table;
    responsive to determining that a cache entry for the page ID is found in the cache lookup table, comparing, by the one or more servers, the userID from the request to a user ID in the found cache entry;
    if the user IDs match,
        processing, by the one or more servers, the request using the found cache entry to generate a response; and
        sending, by the one or more servers, the response to the single page application on the client device; and
    if the user IDs do not match,
        creating a new cache entry in the cache lookup table, processing the request using the new cache entry to generate a response, and sending the response to the single page application on the client device.

2. The computer-implemented method of claim 1, further comprising:
    if the request contains no page ID or the page ID is null, creating a new cache entry in the cache lookup table for component data, and processing the request using the new cache entry to generate a response, deleting the new cache entry, and sending the response to the single page application on the user device.

3. The computer-implemented method of claim 1, further comprising:
    if the user IDs do not match, creating a new cache entry in the cache lookup table for component data, processing the request using the new cache entry to generate a response, deleting the new cache entry, and sending the response to the single page application on the user device.

4. The computer-implemented method of claim 1, wherein the request is a hypertext transport protocol (HTTP) request, and the page ID is included as one of a custom HTTP header, added as a query-string parameter in a uniform resource locator (URL) of the single page, or encoded within a body of an HTTP Post request.

5. The computer-implemented method of claim 1, wherein the page ID is unique for the single page application.

6. The computer-implemented method of claim 1, wherein each cache entry of the cache lookup table stores component data of only one single page.

7. The computer-implemented method of claim 1, wherein a cache entry of the cache lookup table is indexed by the page ID.

8. The computer-implemented method of claim 1, wherein if a new cache entry is created in the cache lookup table, storing the user ID of the request in the new cache entry.

9. The computer-implemented method of claim 1, wherein the cache entry associated with the page ID is valid for only the duration of a single page view of the single page application.

10. A non-transitory machine-readable storage medium that provides instructions that, if executed by one or more processors, are configurable to cause the one or more processors to perform operations comprising:
    processing a request received from a component of a single page application on a client device;
    obtaining a page identifier (ID) from the request;
    obtaining a user ID from the request;
    searching a cache lookup table for a cache entry associated with the page ID;
    determining whether a cache entry for the page ID is found in the cache lookup table responsive to determining that a cache entry for the page ID is found in the cache lookup table, comparing the user ID from the request to a user ID in the found cache entry;
    if the user IDs match,
        processing the request using the found cache entry to generate a response; and sending the response to the single page application on the client device; and if the user IDs do not match,
creating a new cache entry in the cache lookup table, processing the request using the new cache entry to generate a response, and sending the response to the single page application on the client device.

11. The non-transitory machine-readable storage medium of claim 10 that provides instructions that, if executed by one or more processors, are configurable to cause the one or more processors to perform operations, further comprising:

if the request contains nopage ID or the page ID is null, creating a new cache entry in the cache lookup table for component data, and processing the request using the new cache entry to generate a response, deleting the new cache entry, and sending the response to the single page application on the user device.

12. The non-transitory machine-readable storage medium of claim 10 that provides instructions that, if executed by one or more processors, are configurable to cause the one or more processors to perform operations comprising:

when the user IDs do not match, creating a new cache entry in the cache lookup table for component data, processing the request using the new cache entry to generate a response, deleting the new cache entry, and sending the response to the single page application on the user device.

13. The non-transitory machine-readable storage medium of claim 10, wherein the request is a hypertext transport protocol (HTTP) request, and the page ID is included as one of a custom HTTP header, added as a query-string parameter in a uniform resource locator (URL) of the single page, or encoded within a body of an HTTP Post request.

14. The non-transitory machine-readable storage medium of claim 10, wherein the page ID is unique for the single page application.

15. The non-transitory machine-readable storage medium of claim 10, wherein each cache entry of the cache lookup table stores component data of only one single page.

16. The non-transitory machine-readable storage medium of claim 10, wherein a cache entry of the cache lookup table is indexed by the page ID.

17. The non-transitory machine-readable storage medium of claim 10, wherein the cache entry associated with the page ID is valid for only the duration of a single page view of the single page application.

18. A system comprising:
one or more servers configurable to cause:
processing a request received from a component of a single page application on a client device;
obtaining a page identifier (ID) from the request;
obtaining a user ID from the request;
searching a cache lookup table for a cache entry associated with the page ID;
determining whether a cache entry for the page ID is found in the cache lookup table;
responsive to determining that a cache entry for the page ID is found in the cache lookup table, comparing the userID from the request to a user ID in the found cache entry;
if the user IDS match,
processing the request using the found cache entry to generate a response; and
sending the response to the single page application on the client device; and
if the user IDs do not match,
creating a new cache entry in the cache lookup table, processing the request using the new cache entry to generate a response, and sending the response to the single page application on the client device.

19. The system of claim 18, the servers further configurable to cause:
if the request contains nopage ID or the page ID is null, creating a new cache entry in the cache lookup table for component data, and processing the request using the new cache entry to generate a response, deleting the new cache entry, and sending the response to the single page application on the user device.

20. The system of claim 18, wherein the cache entry associated with the page ID is valid for only the duration of a single page view of the single page application.

* * * * *